Sept. 11, 1962 MASAO KUBOTA 3,052,951
CUTTING TOOL
Filed March 2, 1959 2 Sheets-Sheet 1
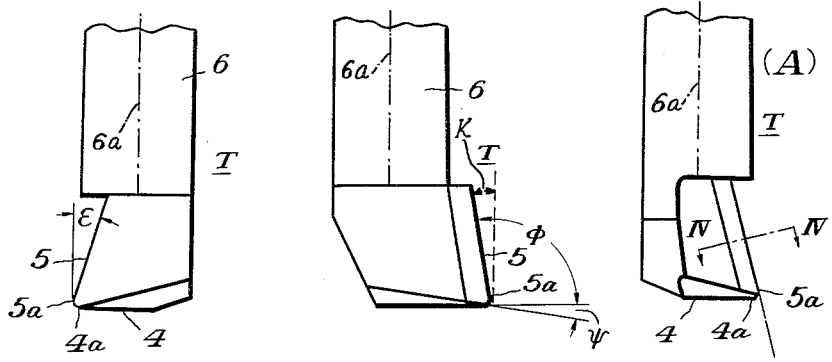
*Fig. 1.* *Fig. 2.* *Fig. 4.*
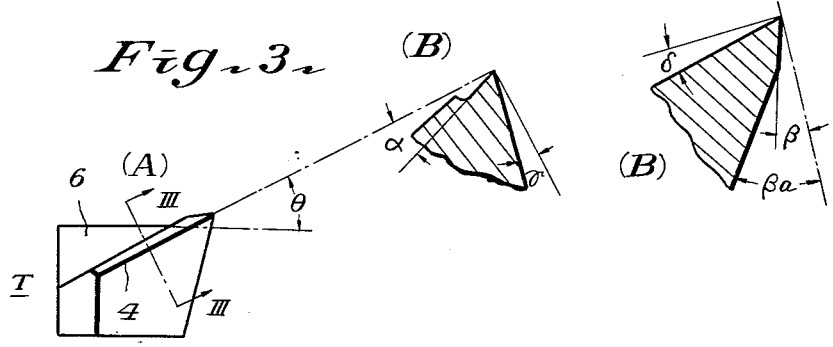
*Fig. 3.*
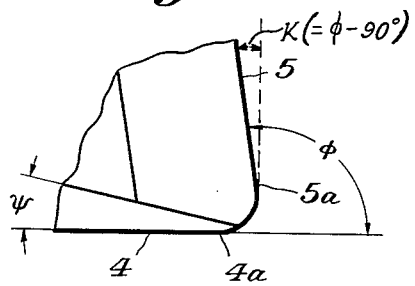
*Fig. 5.*

United States Patent Office 3,052,951
Patented Sept. 11, 1962

3,052,951
CUTTING TOOL
Masao Kubota, Tokyo, Japan, assignor to Agency of Industrial Science and Technology, Ministry of International Trade and Industry, Tokyo, Japan
Filed Mar. 2, 1959, Ser. No. 796,411
Claims priority, application Japan Mar. 13, 1958
2 Claims. (Cl. 29—95)

The present invention relates to an improved cutting tool.

An essential object of the present invention is to provide an improved cutting tool which can effectively carry out rough cutting as well as finishing cutting jointly and simultaneously without any chattering.

Said object, other objects and novel features of the present invention will be apparent from the following detailed description, when taken together with the accompanying drawings, in which the same members are indicated by the same numerals and characters and in which:

FIG. 1 is a side view of the cutting tool of the present invention, the shank portion thereof being partly shown;

FIG. 2 is a plan view of the cutting tool of FIG. 1, the shank portion thereof being partly shown;

FIG. 3(A) is an elevational view of the cutting tool of FIGS. 1 and 2;

FIG. 3(B) is a sectional view taken on line III—III in FIG. 3(A);

FIG. 4(A) is another side view of the cutting tool shown in FIGS. 1–3, the shank portion thereof being partly shown;

FIG. 4(B) is a sectional view taken on line IV—IV in FIG. 4(A);

FIG. 5 is an enlarged view of the end portion of the cutting tool of FIG. 2;

Figure 6:
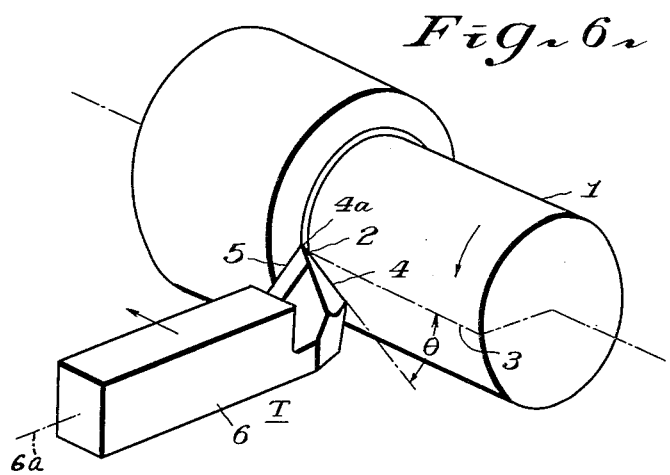
FIG. 6 is a perspective view for showing the status in which a work piece of cylindrical outer surface is being cut by the cutting tool of the present invention.
Figure 7:
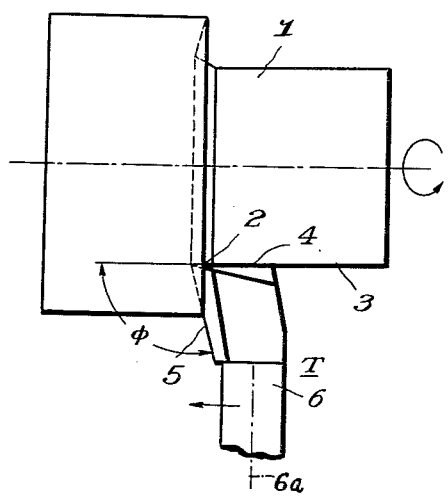
FIG. 7 is a plan view of FIG. 6.

Referring to the drawings, particularly to FIGS. 6 and 7, the cutting tool T has a shank 6 and a working end or point comprising a forward cutting edge 4 and a side cutting edge 5, whose point of intersection is sometimes rounded or chamfered. For the purpose of illustration, the longitudinal axis 6a of shank 6 is taken to be set horizontally as shown and, in plan view projection, perpendicular to the centerline of the work piece, which, here, is taken to be horizontally orientated. The direction of feed is taken to be horizontal, perpendicular to the axis 6a of the shank 6 and to the left of the tool as viewed in plan view. The cutting edge 4 is formed to lie in a plane perpendicular to the longitudinal axis 6a of the shank 6 at the extreme front end of the tool T and to be orientated at an angle $\theta$, which is of some value other than 90° with respect to the horizontal plane. The cutting edge 5 is formed to extend, from heel to toe, forwardly and to the left of the tool T in the direction of the feed, making an obtuse angle $\phi$ with the direction of the feed. Both cutting edges are provided with suitable angles of rake and clearance as will be described in more detail hereinafter. The face surfaces cooperative with the cutting edges have independent rakes and the rake surface cooperative with the front cutting edge is inclined downwardly in a direction of side feed of the tool as hereafter described.

In a cutting operation, the straight cutting edge 4 is set so as to be in contact, at a point 2, with a surface 1 to be finished such as a cylindrical surface or some other curved surface of a work piece, and intersects a generatrix 3 of said surface 1 at an angle $\theta$ other than 90°, said generatrix being in the feeding direction of the cutting tool and passing through the point 2. When angle $\theta=0$ and the surface 1 is of cylindrical surface, the cutting edge 4 coincides with the generatrix 3. The cutting edges 4 and 5 are made to intersect with each other at a point or the tip portion 4a of the cutting edge 4 is made to coincide with the contact point between the cutting edge 4 and the work piece surface 1 or with a point near the above-mentioned contact point by the formation of a small arc portion or chamfered corner between the tip portions 4a and 5a of the cutting edges 4 and 5 as shown in FIG. 5. In FIG. 6, the tip portion 4a is shown to coincide with a point which is somewhat above the contact point of the cutting edge 4 with the surface 1.

When such a cylindrical outer surface as shown in FIG. 6 is to be cut, the straight cutting edges 4 and 5 participate, respectively, in carrying out finishing cutting and rough cutting. The straight cutting edge 4 having an angle relative to the generatrix 3 (said straight cutting edge being the same as the cutting edge proposed by the same inventor which was published as the Japanese publication No. 3,499/1957 and was filed on Feb. 11, 1956, now Japanese Patent No. 273,555 granted March 31, 1961) has a large component of cutting velocity along the cutting edge, so that the cutting is made very effective, and a desirable smooth finish is obtained. Moreover, a precise adjustment of the setting center height of the cutting blade on the surface to be finished becomes unnecessary, because it is only necessary to maintain the cutting blade in contact with the surface to be finished. The backing component (i.e., radial component as to the work, or axial component as to the tool) of the cutting force of such a cutting edge 4 as described above is larger than that of the conventional cutting tool, so that chattering is liable to occur. However, since the setting angle $\phi$ of the straight cutting edge 5 is an obtuse angle, the backing component of the cutting force of said edge 5 takes a negative value, namely acts to pull in the cutting tool toward the work piece in such a manner that said backing component tends to cancel the positive backing component of the cutting force induced by the cutting edge 4 and by the arcuate or chamfered corner at the intersection point of the cutting edges 4 and 5. Accordingly, when the various conditions such as magnitude of the setting angle $\phi$, height of the intersection point of the cutting edges 4 and 5, depth of cut of the edge 5 and feed rate of the cutting tool are suitably selected, the resultant backing component can be made to be a minor positive value, whereby deflection of the work becomes small and chattering will be diminished, thus enabling a stable cut to be made. Furthermore, the components of the reactions to the cutting forces of the cutting edges 4 and 5 in the feeding direction are opposite to each other, so that said components in the feeding direction tend to cancel each other, thus reducing said components in the feeding direction. If the rake surfaces of both cutting edges 4 and 5 are made to lie in a common plane by a certain combination of the inclination angle $\theta$ of the cutting edge 4, the setting angle $\phi$ of the cutting edge 5 and the true rake angle $\alpha$ of the cutting edge 4, the true rake angle $\beta$ of the cutting edge 5 will be determined, but the true rake angles may be selected at will, within certain limits, if physical undulations or steps are permitted in the profile of the rake surfaces.

In fact, according to the results of many experiments, I have succeeded in determining the respective values of the two true rake angles which are suitable for practical use.

An actual embodiment of the cutting tool of the present invention is shown in FIGS. 1, 2, 3 and 4, in which a rake surface has been ground from the point near the intersection point of the cutting edges 4 and 5 in the direction having an angle $\psi$, in plan view, relative to the direction of the cutting edge 4 in order to set the true rake angles of the cutting edge 5 at $\beta$ and $\beta a$ (FIG. 4(B)) and to give a true rake angle $\alpha$ (FIG. 3(B)) to the cutting edge 4. When a front rake angle $\Sigma$ ($>0$) relative to the radial direction of the work piece is given to the cutting edge 5 as shown in FIG. 1, the negative backing component of the cutting force is increased. Of course, the edges 4 and 5 have, respectively, suitable relief angles $\gamma$ (FIG. 3(B)) and $\delta$ (FIG. 4(B)).

According to my experiments, I have found that the following angles are most suitable, but other angles may be used.

$\theta = 30° \sim 50°$  $\beta > Ba > \theta$
$\phi = 95° \sim 110°$  $\gamma = 5° \sim 10°$
$\beta = -5° \sim -15°$  $\delta = 5° \sim 10°$
$\psi = 10° \sim 20°$  $\epsilon = -10° \sim 10°$
$\kappa = (\phi - 90°)$ Since the setting angle $\phi$ is of an obtuse angle, the cutting edge 5 can cut any end surface and step surface of any work piece. Accordingly, the cutting tool of the present invention can be applied to any profiling lathe. The cutting edges may be modified to modify the rounded end portions, chamfered corner, rake surfaces and relief surfaces. For example, the surfaces may be modified to have a primary negative relief angle and a secondary positive relief angle. For the purpose of boring, the cutting edge 4 is preferably formed as an arcuate edge which will be clear of the finished surface except in the actual cutting portion for example as an arc edge having a smaller radius than the radius of the internal surface.

The cutting tool of the present invention can be embodied as a cutting tool of any type such as a complete tool, cutting tool having a brazed tip, cutting tool having a clamped tip, and the like, and moreover, it may be provided with a chip breaker. In these cases, any material such as high speed steel, sintered carbide, ceramic, and the like may be used to make the tip.

The cutting tool of the present invention is to be used principally for cutting any surface of revolution, but may be used to carry out planning or shaping.

As a whole, according to the cutting tool of the present invention, rough cutting and finishing cutting can be effectively carried out jointly and simultaneously without being accompanied by any chattering to produce a finished surface which is desirably smooth, the tool life is prolonged, and the cutting efficiency is remarkably increased.

What I claim is:

1. A combination roughing and finishing cutting tool comprising a longitudinal body having a longitudinal axis, said body terminating at one end in a cutting point defined by the joining of a rough cutting straight side cutting edge and a finish cutting straight front cutting edge, each of said cutting edges having a point end and a trailing end, said point end of said edges coinciding with said cutting point, said side cutting edge having conventional side rake and clearance faces which present rake and clearance angles in a range of 5° to 10°, said point of said side cutting edge leading said trailing end thereof in a trans-axial direction away from said body, said front cutting edge lying in a trans-axial plane which is perpendicular in all respects to said axis, said front cutting edge having a rake face presenting a side rake in the range of 30° to 50°, and the angle between said straight edges being less than 90°.

2. The cutting tool of claim 1, wherein the cutting point is modified by a small radius and the said cutting edges are joined by said radius.

References Cited in the file of this patent
UNITED STATES PATENTS

| | | |
|---|---|---|
| 1,596,978 | Klopstock | Aug. 24, 1926 |
| 1,912,666 | Swanson | June 6, 1933 |
| 2,164,303 | Berg | July 4, 1939 |
| 2,309,371 | Wissler | Jan. 26, 1943 |
| 2,392,001 | Raper | Jan. 1, 1946 |
| 2,677,170 | Kuns | May 4, 1954 |

FOREIGN PATENTS

| | | |
|---|---|---|
| 121,821 | Australia | Aug. 8, 1946 |
| 894,494 | Germany | Oct. 26, 1953 |
| 901,616 | Germany | Jan. 14, 1954 |